United States Patent
Sloyan et al.

(10) Patent No.: US 11,650,903 B2
(45) Date of Patent: May 16, 2023

(54) COMPUTER PROGRAMMING ASSESSMENT

(71) Applicant: BRAINFIGHTS, INC., San Francisco, CA (US)

(72) Inventors: Tigran Sloyan, San Francisco, CA (US); Albert Sahakyan, Yerevan (AM)

(73) Assignee: CODESIGNAL, INC., San Francisco, CA (US)

( * ) Notice: Subject to any disclaimer, the term of this patent is extended or adjusted under 35 U.S.C. 154(b) by 0 days.

(21) Appl. No.: 16/511,005

(22) Filed: Jul. 15, 2019

(65) Prior Publication Data

US 2019/0361791 A1    Nov. 28, 2019

Related U.S. Application Data

(63) Continuation-in-part of application No. 15/418,342, filed on Jan. 27, 2017, now Pat. No. 10,353,703.

(60) Provisional application No. 62/838,675, filed on Apr. 25, 2019, provisional application No. 62/288,312, filed on Jan. 28, 2016.

(51) Int. Cl.
*G06F 11/36* (2006.01)
*G06F 8/41* (2018.01)

(52) U.S. Cl.
CPC ............ *G06F 11/3612* (2013.01); *G06F 8/41* (2013.01); *G06F 11/3688* (2013.01); *G06F 11/3692* (2013.01)

(58) Field of Classification Search
None
See application file for complete search history.

(56) References Cited

U.S. PATENT DOCUMENTS

| | | |
|---|---|---|
| 5,297,150 A | 3/1994 | Clark |
| 6,128,773 A | 10/2000 | Snider |
| 6,393,437 B1 | 5/2002 | Zinda et al. |

(Continued)

OTHER PUBLICATIONS

Mccracken, M., Almstrum, V., Diaz, D., Guzdial, M., Hagan, D., Kolikant, Y.B.D., . . . & Wilusz, T., A multi-national, multi-institutional study of assessment of programming skills of first-year CS students. Working group reports from ITiCSE on Innovation and technology in computer science education, Dec. 2001, pp. 125-180. Association for Computing Machinery, New York, NY, United States.

(Continued)

*Primary Examiner* — Lewis A Bullock, Jr.
*Assistant Examiner* — Mark A Gooray
(74) *Attorney, Agent, or Firm* — Arluys IP, P.C.

(57) ABSTRACT

Techniques are described for generating a programming score for a user based on source code submissions for a programming task set. In an embodiment, a programming system generates, at random, a programming task set for submission by a user. The programming system receives source codes submitted for the programming task set in a programming session with a client computer system of a user. The programming system executes the source codes to evaluate their accuracy. Based on the execution, the programming system determines that some source codes are evaluated to be accurate thereby solving corresponding programming tasks from the programming task set. Based on such an execution, programming system determines the programming score for the particular user for the programming task set.

20 Claims, 6 Drawing Sheets

(56) References Cited

U.S. PATENT DOCUMENTS

| | | |
|---|---|---|
| 7,480,900 B1 | 1/2009 | Zhou et al. |
| 7,904,909 B1 | 3/2011 | Reiner et al. |
| 9,098,377 B1 | 8/2015 | Tibble et al. |
| 9,851,998 B2 | 12/2017 | Cochran |
| 2002/0132656 A1* | 9/2002 | Lydon .................... G06Q 10/06 463/9 |
| 2004/0205772 A1 | 10/2004 | Uszok |
| 2007/0116224 A1 | 5/2007 | Burke |
| 2009/0014469 A1 | 1/2009 | Bawcom |
| 2009/0044264 A1 | 2/2009 | Ramanathan et al. |
| 2009/0144698 A1 | 6/2009 | Fanning et al. |
| 2009/0190676 A1 | 7/2009 | Nissani (Nissensohn) |
| 2009/0217246 A1* | 8/2009 | Kondur ................. G06Q 30/02 717/126 |
| 2011/0302657 A1 | 12/2011 | Ikegami |
| 2012/0272220 A1 | 10/2012 | Calcagno |
| 2012/0290950 A1 | 11/2012 | Rapaport |
| 2014/0013304 A1 | 1/2014 | Vangala et al. |
| 2014/0123108 A1 | 5/2014 | Cheluvaraju et al. |
| 2014/0282586 A1 | 9/2014 | Shear et al. |
| 2015/0019640 A1 | 1/2015 | Li et al. |
| 2015/0063556 A1 | 3/2015 | Uba et al. |
| 2015/0143339 A1 | 5/2015 | Rajanna et al. |
| 2015/0378863 A1 | 12/2015 | Balachandran |
| 2016/0034839 A1* | 2/2016 | Aggarwal ........ G06Q 10/06398 705/7.42 |
| 2016/0044380 A1 | 2/2016 | Barrett |
| 2016/0098287 A1 | 4/2016 | Prasad et al. |
| 2016/0154727 A1 | 6/2016 | Broomhall et al. |
| 2016/0217701 A1* | 7/2016 | Brown .................... G09B 7/00 |
| 2016/0283362 A1 | 9/2016 | Seto et al. |
| 2017/0075790 A1 | 3/2017 | Macleod et al. |
| 2018/0136933 A1 | 5/2018 | Kogan et al. |

OTHER PUBLICATIONS

Giordano, D., Maiorana, F., Csizmadia, A. P., Marsden, S., Riedesel, C., Mishra, S., & Vinikiene, L., New horizons in the assessment of computer science at school and beyond: Leveraging on the viva platform. Proceedings of the 2015 ITiCSE on Working Group Reports, Jul. 2015, pp. 117-147. Association for Computing Machinery, New York, NY, United States.

* cited by examiner

COMPUTER PROGRAMMING ASSESSMENT

BENEFIT CLAIM

This application claims the benefit under 35 U.S.C. § 119(e) of provisional application 62/838,675, filed Apr. 25, 2019, and further claims the benefit under 35 U.S.C. § 120 as a continuation-in-part of application Ser. No. 15/418,342, filed Jan. 27, 2017, which claims the benefit under 35 U.S.C. § 119(e) of provisional application 62/288,312, filed Jan. 28, 2016, the entire content of each of the above-mentioned applications is hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Integrated development environment systems (IDEs) provide software developers with computer programming tools to aid, for example, developing, debugging, and compiling the source code of computer programs. Given a programming task, a developer can utilize IDE to develop a computer program that accomplishes the task. However, the accuracy and quality of the developed program may not be readily ascertained by IDE, and thus, the assessment of the program with respect to the programming task is in no way ascertained.

One solution for testing the accuracy of computer programs is to utilize a separate set of automated test tools in addition to IDE. While IDE may verify that the developed source code for a task could be executed as a program, the automated test tools may verify that the program indeed accurately accomplishes the task. However, using the automated test tools require a comprehensive manual configuration of the automated test tools. Test cases need to be generated to contain inputs and expected outputs of a program for the inputs. The program is then executed with the manually configured inputs, and the program generated outputs are automatically compared with the expected outputs to determine the accuracy of the source code.

Additionally, neither IDE nor automated test tools may be able to evaluate the quality of computer programming. Particularly, traditional systems lack metrics and automation to compare programs developed by different software developers. There are perhaps endless permutations on source codes to accomplish a task, and different developers that are assigned the same task may write very different source code. Although the programs developed by developers may pass the test cases, the source code generated by different developers may have vastly different quality.

Furthermore, even if a single programming source code of a developer is evaluated to be accurate and having good quality, there is no guarantee that for other programming tasks the same developer can consistently produce accurate and good quality source codes. Assessment of the programming skill presents a significant challenge because the assessment involves a wide spectrum of criteria to be applied on a wide spectrum of programming concepts in a large number of programming languages.

Traditionally computer programming assessment of a developer has been performed in ad-hoc fashion based on requirements imposed by the entity performing the assessment. A narrow set of programming tasks are manually selected from a library of computer programming tasks based on a perceived need of a particular subject of programming. The tasks are then provided to a pre-selected set of users using a computer programming evaluation platform for the users to submit the respective source codes for the computer programming tasks.

The problem is further exacerbated because the computer programming platform generally provides a binary evaluation of the submitted source codes for the computer programming tasks: correct or incorrect. The users are then assigned computer programming assessments based on the number of the correct and incorrect evaluations of the submitted source codes to the computer programming platform.

Accordingly, the computer programming assessment process is hindered at each and every stage: with lack of technical data analysis at the computer programming task selection stage, at the computer programming evaluation stage, and final computer programming score assignment stage. Thereby, the current approaches of computer programming assessment generate skewed results and inaccurately represents the computer programming skills of a user.

To solve the above-mentioned and other technical problems, the improved techniques which shall be described hereafter have been developed.

BRIEF DESCRIPTION OF THE DRAWINGS

In the drawings of certain embodiments in which like reference numerals refer to corresponding parts throughout the figures.

DETAILED DESCRIPTION

Figure 1:
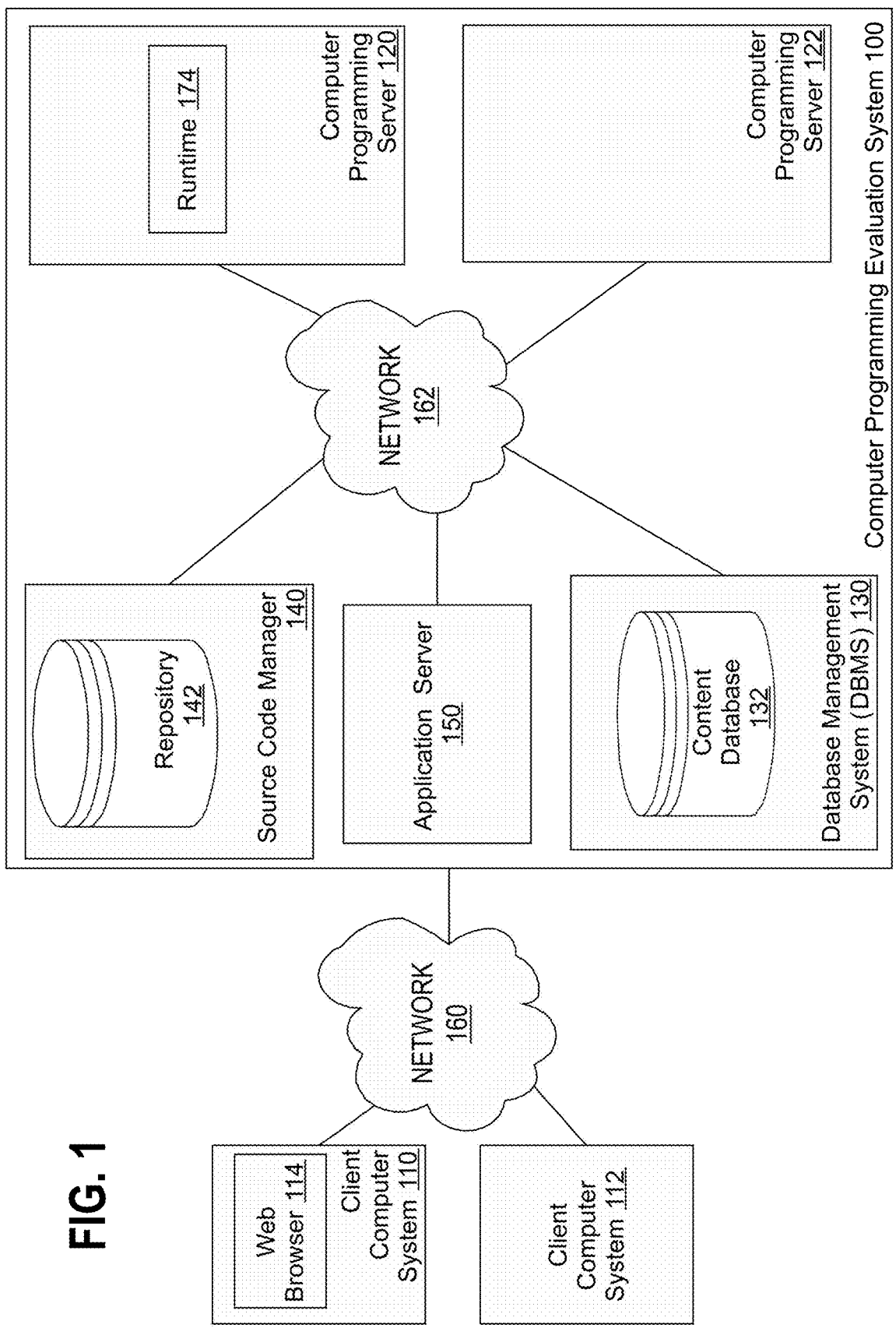
FIG. 1 is a block diagram that depicts a computer programming evaluation system 100, in an embodiment.

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

General Overview

The approaches herein describe a computer programming evaluation system for data-driven selection, evaluation, and scoring of computer programming to assess computer programming skills of a user. A computer programming evaluation system ("programming system") provides a user with one or more programming tasks and ability to input source code to solve the programming tasks. The term "programming task" refers to data describing a well-defined problem statement for which a user may be asked to develop source code.

In an embodiment, each programming task in a programming task set presented to a user is assigned a programming score and/or a programming score range (referred herein to as "task score"). The task score may be based on a scale, whose one end represents higher skills in programming, and the other end represents lower skills in programming.

In an embodiment, the programming system presents to a user sequentially or all at once a programming task set for developing source codes. Each programming task may correspond to a particular level of complexity and/or subject matter of programming tasks and may be selected at random from numerous programming tasks for the same level.

Upon receipt of source code from a user that correctly solves a programming task, a programming system may assign the user the corresponding task score of the programming task. The "programming score" term refers to the score assigned to a user for submitting one or more accurate source codes for programming tasks in a programming task set. Each correctly evaluated programming task by a user increases the programming score of the user.

In an embodiment, the programming evaluation system evaluates received source code submission(s) for a programming task set to generate consistent programming score(s) for a user corresponding to the skill level of the user. Although the programming evaluation system may generate different programming task sets that include different programming tasks for a particular subject matter, the programming scores generated based on the submissions for the different programming sets by the same user are consistent for the particular subject matter. The programming system may determine that the same user has submitted source codes two different task sets by comparing user identifiers received with the submissions.

To achieve the consistency in evaluations of different and dynamic programming task sets for a subject matter, in one embodiment, such programming sets include different programming tasks that correspond to the same one or more skill-level categories selected for the subject matter. The programming evaluation system may select skill-level categories for the programming task set, and for each selected skill-level category, randomly select one or more programming task set associated with the skill-level category. In another embodiment, the programming evaluation system may pre-generate a plurality of programming task sets and randomly select programming tasks by randomly selecting one of the pre-generated programming task sets, when a request from a client compute system is received. Such a pre-generated task set similarly includes programming tasks from a number of different skill level categories.

In an embodiment, solving the same programming task in a programming set may yield different programming scores for different users. To improve the accuracy of a programming score, a correctly evaluated source code for each additional programming task in a programming task set increases the programming score of a user only by a weighted fraction of the corresponding task score of the programming task. In one embodiment, the user is first assigned the highest task score from the task scores of the solved tasks, and for each subsequent programming task in the set, in descending order of task scores, a decreasing portion of the score is assigned to the user.

In other embodiments, the fraction for additionally solved problems may depend additionally or alternatively on other factors, such as the sequence in which the programming task is selected or presented to the user in the programming set. For example, the later received source code solutions may be given a lesser task score than the earlier received ones for the same programming task.

Additionally, source code received by programming system may be evaluated based on one or more of pre-compile, compile-time and run-time metrics, alone or collectively referred herein as "result metrics." These result metrics are numerical values that measure efficiency, quality, and robustness of the received source code.

In an embodiment, a programming score for a user is generated based on result metrics generated by the programming system for received source codes from the user for a programming task set. The programming score may be calculated based on each programming task's result metric value(s) using techniques described herein. In a related embodiment, the result metric values of a programming task may only affect a variation score that is assigned to a user for submitting a correctly evaluated source code to the programming system. The "variation score" term refers to a value that is subtracted or added to a programming score of a user for a programming set to yield a new programming score.

Accordingly, the programming score not only depends on the number of correct source code submissions for a programming task set but the result metrics uniquely representing various properties of the received source code. The non-limiting examples of properties include the speed of developing the correct source code, quality of the source code, number of incorrect submissions.

In an embodiment, various statistical and artificial intelligence models ("models" hereafter) are applied to the result metrics generated from computer program evaluations of source codes submitted by users for programming tasks. Such an application of the models generated for a large sample of users on a per-user basis may yield a more accurate and more normalized task score for a programming task and thus, a more accurate programming score for a user.

In an embodiment, computer programming tasks are categorized based on the numerous programming evaluations of source codes submitted by users. For example, a set of computer programming tasks may be categorized to be associated with a specific skill level necessary for developing programming source codes to solve this category of programming tasks.

System Overview

FIG. 1 is a block diagram that depicts a computer programming evaluation system 100, in an embodiment. Computer programming evaluation system (programming system) 100 includes application server 150. Application server 150 serves as an interface of programming system 100. Client computer systems 110 and 112 connect to programming server 120 to establish programming sessions for computer programming server 120 or 122 to execute instances of source code received in the sessions. In an embodiment, application server 150 is connected with the other components of programming system 100 through network 162, which is internal to programming system 100.

In an embodiment, client computer systems 110 connects with application server 150 to establish programming sessions through network 160. Application server 150 may provide client computer system 110 and 112 user interface elements based on content data obtained from content database 132. Application server 150 connects to DBMS 130 through network 160 and queries DBMS 130 for the content data from content database 132. In addition to the content data, content database 132 may also store information about users of programming system 100.

Network 160 and 162 broadly represents a digital data telecommunications network comprising any combination of a local area network (LAN), a wireless LAN (WLAN), a wide area network (WAN), a wireless WAN (WWAN), a metropolitan area network (MAN), an ad hoc network, an intranet, an extranet, a virtual private network (VPN), a portion of the Internet, the Internet, a portion of a public switched telephone network (PSTN), or a cellular network.

In an embodiment, web browser 114 on client computer system 110 may receive the information from the application server 150 through network 160. Using the information, web browser 114 may display an IDE environment to the user of client computer system 110 to input source code for a programming task. A user may submit an instance of source code to application server 150 through the established programming session between web browser 114 and application server 150. Once received, application server 150 may request a programming server, such as computer programming server 120 or 122, to execute the instance of the source code.

In one embodiment, application server 150 determines which programming server to request to execute the received instance of source code according to techniques described herein. In another, embodiment, application server 150 deploys a new programming server for the execution according to techniques described herein. Although only computer programming servers 120 and 122 are depicted in FIG. 1, in a practical environment there may be many more, perhaps hundreds or thousands, of programming servers sharing the load of the programming sessions.

To execute an instance of the source code, a programming server, such as computer programming server 120 or 122, schedules the source code to be executed by a secure runtime environment such as runtime 174, in an embodiment. Computer programming server 120 upon receipt of an instance of the source code may request runtime manager (not depicted in FIG. 1) to stop previous runtime 174 and spawn a new secure runtime environment according to techniques described herein.

In addition to the instance source code, a programming server, such as computer programming server 120 or 122, may receive from application server 150 information on the programming task for which the instance of source code was submitted. In an embodiment, repository 142 of programming system 100 stores programming tasks that are served to users. Application server 150 connects to source code manager 140 to request programming task data for one or more programming tasks.

Programming task data may contain the source code of a programming task written in one or more programming languages. The programming task data may also include programming task description, program bug data, complexity data, test case data, and/or other data to describe the programming task. The programming task data that excludes source code is referred herein as "programming task metadata." In an embodiment, programming task metadata of a programming task may be encoded in the source code of the programming task in the form of one or more comments.

In an embodiment, source code manager 140 is mounted as a file system at a mount point of computer programming servers 120/122. In an embodiment, to improve security and further isolate execution of user-submitted source codes from having access to modify programming task data, only application server 150 has access to the repository 142 and not any of programming servers and/or runtime environments. In such an embodiment, for a source code execution request, application server 150 retrieves test case data for the corresponding programming task and sends the data in addition to the received source code to computer programming server 120 or 122.

Programming task data, such as test case data, may be retrieved by issuing file system requests for one or more files stored in repository 142. A file system request may include a request to the mount a programming point in computer programming server 120 or application server 150. In another embodiment, programming task data stored in repository 142 is replicated onto a file system accessible by programming system 100.

For example, programming task data for the "Almost Increasing Sequence" programming task may be stored in a folder structure in repository 142. Root folder, "almostIncreasingSequence," may contain "almostIncreasingSequence.cpp" file that contains source code of the programming task in the C++ programming language, "almostIncreasingSequencejava" file that contains source code of programming task in the Java programming language, "almostIncreasingSequence.js" file that contains source code of programming task in the JavaScript programming language, and "almostIncreasingSequence.py" file that contains source code of programming task in the Python programming language. The folder may further contain "meta.json" file that contains programming task metadata in JSON semi-structured data format.

Functional Overview

To assess user programming skills, client computer system 110 may request programming system 100 to present one or more programming task sets for a user, in an embodiment. A programming task set includes programming tasks for evaluating a particular set of programming skills of the user at various levels of complexity. For example, a programming set may include programming tasks which determine whether a user can just develop entry-level programming loops or program tree traversing algorithms.

Figure 2:
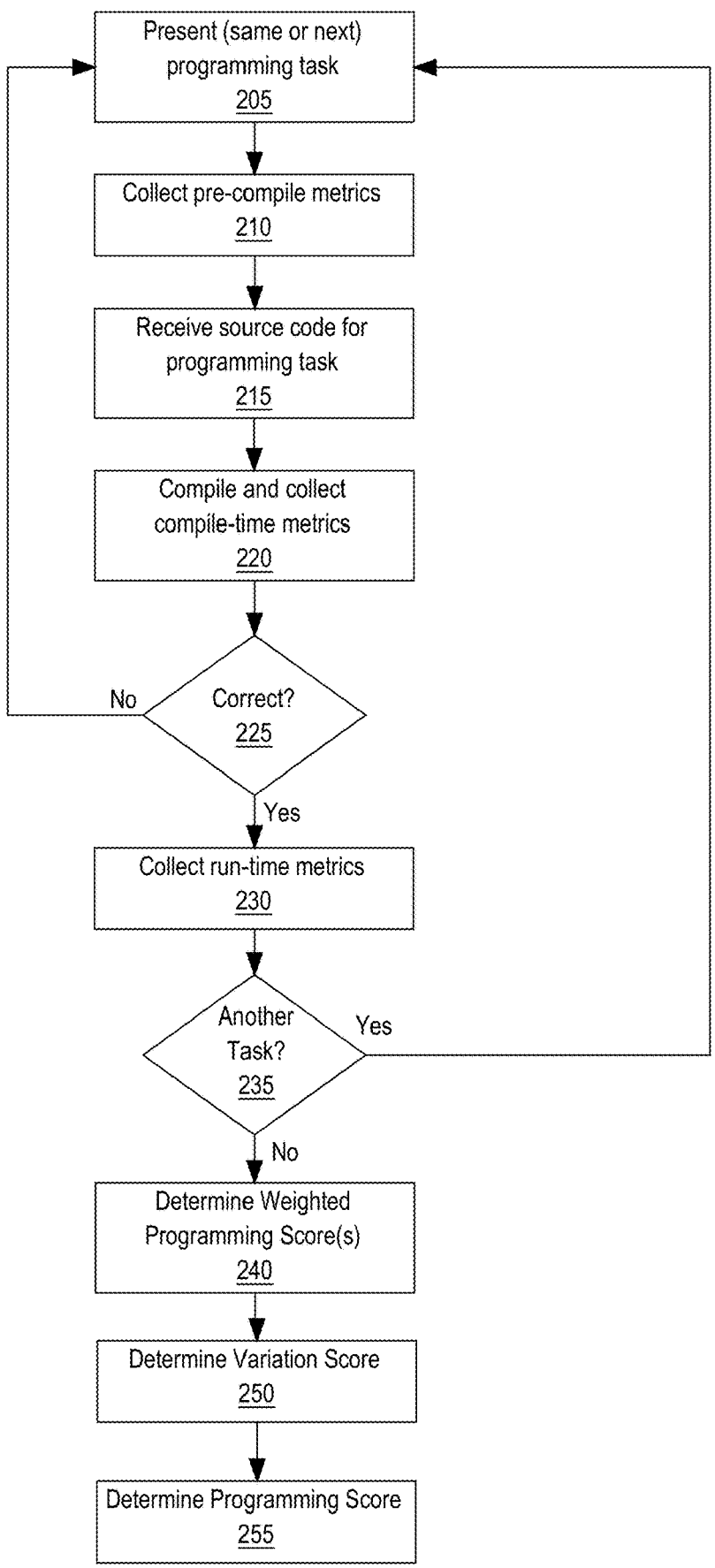
FIG. 2 is a block diagram that depicts a process for determining a programming score for a programming task set, in an embodiment.

FIG. 2 is a block diagram that depicts a process for determining a programming score for a programming task set, in an embodiment. At block 205, in response to a request from a client computer system 110 for programming skill assessment of the user, programming system 100 presents a programming task for the user to develop source code for. At block 210, while the user is developing the source code for submission, programming system 100 is collecting pre-compile metrics, such as time-based metrics, test-based metrics, editorial metrics.

Non-limiting examples of editorial metrics are code length (such as a number of non-commented lines in the source code or a number of non-commented characters/words in the source code) a number of particular operators used (such as JOIN operators in an SQL statement). Other editorial metrics, which represent source code quality, may include detecting consistent indentation and braces, checking for descriptive variable names and other quality-related properties that are not subjective. In an embodiment, each styling rule from industry-based stylings is given a weight depending on how important the rule is for that language of a programming task. Based on the weights, the editorial metrics are calculated.

Non-limiting examples of time-based metrics includes programming duration that is tracked by a programming system from the time at which a programming task is sent and/or received by a computer system of the programming session, to the time at which the source code for the programming task is submitted by a user of the programming session at the client computer as a solution for the programming task. Stated differently, the programming duration measures the time duration for a user to program the source code for the programming task. Such time duration is measured from the time of receiving, at computer system 110, user interface elements with the programming task description to the time when the user submits the source code using the user interface elements.

In a related embodiment, a programming duration metric may exclude time periods of inactivity by a user during programming of the source code at computer system 110. The inactivity period may be detected by tracking keystrokes at computer system 110. An inactivity period may be excluded from the metrics if the time duration between keystrokes is detected to be significant.

A non-limiting example of test-based metrics includes a submission confidence metric. The submission confidence metric may track the number of times the user has submitted source code for the task until successful (accurate source code that passes the test cases of the programming task). The submission confidence metric may include the number of times the user has selected to test source code for the task before submitting accurate source code for the task. Another non-limiting example may include the number of characters erased before submission an accurate source code or the number of characters-typed per a particular unit of a time period (e.g., per minute) when developing the source code.

At block 215, programming system 100 receives the source code for the programming task in the programming task set from computer system 110 for evaluation. In an embodiment, the evaluation of the source code for the programming task requires compiling the source code on programming system 100. In such an embodiment, at block 220, programming system 100 compiles the received source code and collects compile-time metrics. A secure runtime environment invoked to compile the received source code may track and record the compile-time metrics. Non-limiting examples of the compile time metrics include a number of methods/attributes/classes/packages, depth of inheritance information, and code path permutations.

At block 225, the source code received from computer system 110 for the programming task in the programming task set is evaluated. If evaluated to be inaccurate, the unsuccessful attempt is recorded, and the process proceeds to block 205, at which a programming task is presented. In one embodiment, programming system 100 causes computer system 110 to present the same programming task for submission of the source code because the previously submitted source code was inaccurate. In another embodiment, the next programming task in the programming task set is presented to the user. In yet another embodiment, based on various factors, such as time spent submitting the source code for the programming task, programming system 100 determines whether to present the same or the next programming task within the programming set, even if the previously submitted source code is incorrect. For example, each programming task in the programming set may be allotted a particular time period for submission of the source code. Within such time period, the same programming task will be presented to the user, when the user's previously submitted source code is inaccurate. Once the time period expires for the programming task, programming system 100 may present the next programming task in the set, even if the source code for the programming task is evaluated to be inaccurate/incorrect.

At block 230, if the source code is evaluated to be correct/accurate, the process collects various run-time metrics of the program generated from the source code. Non-limiting examples of the run-time metrics include a benchmark-based evaluation metrics, percentage match with user-interface mockup metrics, resource consumption metrics including information about a size of a memory footprint, an amount of CPU consumption, an amount of I/O usage, and the like.

If another programming task exists in the programming set for which source code is to be evaluated, at block 235, then the process proceeds to block 205 for the next programming task to be presented to client computer system 110. Otherwise, the process proceeds to block 240. At block 240, programming system 100 determines the weighted programming score for the accurate source codes based on the task scores of the corresponding programming task.

The weighted programming score may be based on a partial task score of the programming task or the full task score of the programming task, in one or more embodiments. If a programming score already exists for a programming task in the programming set for the user, then a weighted coding score is determined based on the partial task score of the programming task.

The task score (or partial task score) for the programming task may itself depend on the difficulty of a source code required to write to solve the problem as recited in the programming task, thus, measuring the user's code-writing and problem-solving skills.

In an embodiment, to assign a task score to the programming task, a scoring paradigm is selected by programming system 100 to normalize the evaluations generated for source codes of different users. One approach for a scoring paradigm is to define various skill level-based categories for programming tasks, for example, Elementary, Intermediate, Advanced, Upper Advanced, Excellent, Exceptional. The scoring paradigm may assign a task score range to each category. Programming system 100 assigns a task score for a programming task score from the score range, to which the programming task belongs, in an embodiment.

Example Scoring Paradigm

In an embodiment, a scoring paradigm may be created for programming tasks in various subject matters. One example of such a scoring paradigm is the General Coding Assessment (GCA) to evaluate general coding subject matter skills. Although, examples and techniques herein are described in relation to a particular score range defined in GCA, the exact score range used by the paradigm is not critical to the techniques described herein.

The GCA paradigm described herein may be used to create standardized tests to measure core programming and computer science knowledge that is shared between most software engineers and is taught in almost all CS programs throughout the US. Basing a programming task set on a paradigm enables the GCA to be scaled with a large pool of questions that adhere to the same guidelines. On each iteration of a programming task set, programming tasks may be randomly selected from a large pool of programming tasks, reducing the risk that any user may gain an unfair advantage by memorizing the programming in advance.

In an embodiment, the programming score, the score achieved for a programming task set in the GCA-based scoring paradigm, is a singular measure meant to give recruiters, hiring managers and educators—as well as the users themselves—a quick view of the user skills. It measures the user's code-writing and problem-solving skills as well as the ability to produce clean source code at a reasonable speed. GCA and Programming score, may not be language specific, and users may choose any programming language to complete a programming task or a programming task set. In an embodiment, the submitted solutions are automatically checked for plagiarism.

GCA may use the following score-range-to-skill mapping:

TABLE 1

Example categories of programming task(s), score ranges and category-to-programming skill mappings

| Score Range | Category | Description of Skills Required for Programming Task(s) |
|---|---|---|
| 600-649 | Elementary | Can write very basic code, like printing "Hello World!". |
| | | Can do basic arithmetic operations in some language. |
| | | Can assign and re-assign variables. |
| | | Can write basic functions to do simple data manipulation like concatenating strings. |
| | | Can write conditional statements and loops. |
| 650-699 | Intermediate | Can work with basic built-in data structures like strings and arrays. |
| | | Can do data manipulations on basic data structures like changing some elements of a string or finding the maximum value of an array. |
| | | Can solve basic problems involving simple data structures, like reversing an array or a string. |
| | | Can solve problems that involve multiple iterations on a basic data structure. |
| | | Can write nested for loops and use two-pointers. |
| | | May not be able to optimize the code for best performance or understand the algorithmic complexity of their own solution. |
| 700-749 | Advanced | Can transform clearly laid out instructions into working code. For example, can write a function to merge two strings in a special way given the description of the special way. |
| | | Can use simple data structures like linked lists, stacks, queues. |
| | | Can use hash maps but may not fully understand how hash maps work. |
| 750-774 | Upper Advanced | Can write clean and well-structured code. |
| | | Can solve implementation problems quickly and shows a high level of mastery in at least one programming language. |
| 775-799 | Excellent | Can understand and use the ideas of hash maps and other, more advanced data structures. |
| | | Can create their own implementations of advanced data structures similar to hash maps. |
| | | Can solve simple tree search problems like those requiring the application of DFS. |
| | | Can think of and implement non-standard solutions. |
| 800-850 | Exceptional | Can apply multiple advanced concepts mentioned earlier to solve problems. |
| | | Can solve implementation problems very quickly, without incorrect attempts. |
| | | Can write clean and readable code following best practice guidelines for coding style. | ming system 100 may select one or more programming tasks in a skill category and assign to each programming task a task score from the respective category. A programming set may include programming tasks from multiple skill-level categories to accurately evaluate the skill level of a user.

Figure 3:
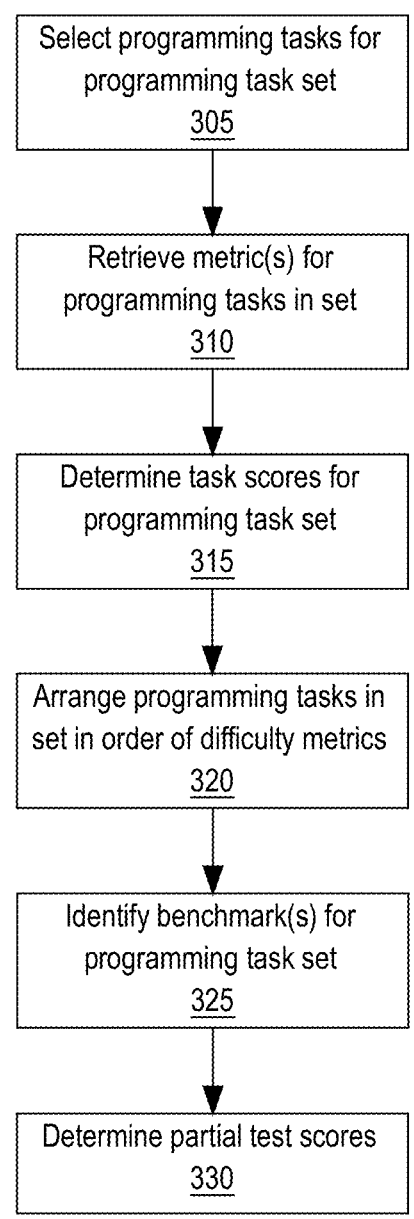
FIG. 3 is a block diagram that depicts generating a programming task set and determining task scores for programming tasks in the set, in an embodiment.

FIG. 3 is a block diagram that depicts generating a programming task set and determining task scores for programming tasks in the set, in an embodiment. At block 305, programming system 100 selects programming tasks for the programming set. The programming tasks may be selected based on having at least one programming task for one or more skill-level categories.

For example, the first task for a programming set may be randomly selected from the "Intermediary" skill level category, and therefore may include problems related to:

Generating Programming Task Set

In an embodiment, programming system 100 generates a programming task set to evaluate the programming skills of a user in a particular programming subject matter. Program-

- Working with numbers (e.g., basic operations with numbers, splitting numbers into digits).
- Basic string manipulation (e.g., splitting a string into sub strings, comparing strings, modifying the elements of a string, concatenating strings, reversing a string).

Basic array manipulation (e.g., iterating over an array, modifying the elements of an array, reversing an array).

Because the example first task is from the "Intermediary" category of programming tasks, the first task may not include problems that require developing source code for:

Noticing or proving a certain pattern.
Optimizing an algorithm.
Classic algorithms.

An example programming task for the first task may be: given a list of words (consisting of lowercase English letters) and a complex word written in camelCase (consisting of English letters), check if the complex word consists of words from the given list.

An example second programming task for the example programming task set may be randomly selected from the "Advanced" category of programming tasks and may include problems related to:

Splitting a task into smaller subtasks/functions.
Manipulating two-dimensional arrays (e.g., iterating over the elements in a particular order, modifying values, swapping rows/columns).
Using hash maps (e.g., using built-in hash maps to store strings or integers as keys).

Because the example second task is from the "Advanced" category of programming tasks, the second task may not include problems that require developing source code for:

Noticing or proving a certain pattern.
Optimizing an algorithm with advanced data structures like binary indexed trees, etc.
Special topics like graphs, number theory, or dynamic programming.

An example second programming task may be: given two strings, merge them with the following merge function: instead of comparing the characters in the usual lexicographical order, compare them based on how many times they occur in their respective strings. Fewer occurrences mean the character is considered smaller; in case of equality, compare them lexicographically; in case of equality, take the character from the first string.

For example, the third task for the example programming set may be randomly selected from the "Upper Advanced" or "Excellent" skill level categories of programming tasks, and therefore may include problems related to.

Working with trees (e.g., storing and traversing trees, transforming trees, algorithms on trees like finding the longest path of a tree).
Understanding hashmaps (e.g., solving tasks that require understanding the implementation of hashmaps, optimizing query executions).
Fundamentals of discrete mathematics.
Brute-force search (e.g., checking all possible solutions to find the optimal solution).

Because the example third task is from the "Upper Advanced" or "Excellent" skill level categories of programming tasks, the third task may not include problems that require developing source code for:

Brain teasers or tasks that require specialized knowledge of certain libraries or advanced algorithms like Dijkstra, Kruskal, FFT, etc.
Tasks that require very long implementation. Unlike the second example task, implementation is not key here; problem-solving is key. Thus, this task should ideally avoid taking up lots of implementation time.

In an embodiment, a randomly selected programming task belongs to multiple skill-level categories. The task score for such a programming task may have a wider task score range spanning the multiple categories. As such, any of the tasks above in the example programming set may include the categories that require a lesser skill level. For example, the second example programming task may necessarily require skills that would map to the "Elementary" or "Intermediate" categories.

In an embodiment, for a particular subject matter, programming system 100 generates programming set that have different programming tasks from the same one or more skill-level categories. If a generated programming task set for a subject matter has a programming task that belongs to multiple skill-level categories for a particular subject matter, then another programming task set for the same subject matter may have a different programming task but corresponding to the same multiple skill-level categories.

For example, a user may request a programming task set for a particular subject matter. Programming system 100 may randomly select programming tasks for pre-selected skill-level categories of the particular subject matter, in some examples by randomly selecting a pre-generated programming task set that includes various programming tasks of the skill-level categories. In such examples, the programming set will cover the same one or more skill-level categories for the particular subject matter. Next time, when the same or another user requests a programming task set for the particular subject matter, programming system 100 may generate a second programming task set that has no programming task sets in common with the previously generated programming task set. However, the second programming task set is generated to cover the same one or more skill-level categories of the particular subject matter. Each of the randomly selected programming tasks in the second programming task set corresponds to a programming task in the previous programming task set from the same skill-level category. In the example, in which the same user repeatedly submits source code(s) for programming task sets for a same subject matter, the programming score for the user for each of the submissions falls within the same skill-level category of programming scores.

In an embodiment, programming system 100 assigns a task score for each programming task in a programming task set. The task score may be a score range or a particular number that is within the score range for category(is) to which the programming task belongs. The task score for a programming task may be stored in programming system 100 associated with the programming task.

Alternatively or additionally, the task score for the programming task may be determined based on the metrics stored for the programming task. The metrics for the programming task may represent the value for the strength of a particular skill required to develop source code for the programming task. The metric value for a programming task and thus, the task score may be determined based on one or more models applied to result metrics of evaluations of the programming task or similar programming tasks by multiple users. The specific set of users may be selected for evaluation. For example, metric values/task score may be based on the distribution of the result accuracy metrics (number of programming tasks with accurate source codes) for the same or similar programming task from a sample of 1000 randomly selected Computer Science seniors studying at US-based universities.

In an embodiment, multiple metrics for a programming task may be combined to determine the task score for the programming task. In one example of such an embodiment, a programming task is associated with a problem-solving difficulty metric and a coding difficulty metric. The task score for the programming task is determined by calculating a weighted or a non-weighted average of the difficulty metric and the coding difficulty metric associated with the programming task.

Continuing with FIG. 3, in such an embodiment, at block 310 metrics associated with each programming task in the programming set is retrieved, and the programming score for the programming task is determined based on the retrieved metrics at block 315. In an embodiment in which the metrics are for problem-solving and coding difficulty, the task score for each programming task is calculated by calculating the (weighted) average of these metrics. For example, computer program developing difficulty, $cd_n$, problem-solving difficulty, $ps_n$, are averaged $$d_n = \frac{ps_n + cd_n}{2},$$

to yield the task score for the nth programming task in a programming task set. Similarly, the task scores for the example programming set may be calculated for the above described first, second and third example programming task respectively: $d_1=675$, $d_2=725$, $d_3=775$.

Difficulty-Based Weighted Task Scores and Partial Programming Scores

The programming score for a user may be determined based on aggregating task scores for the programming tasks in a set, for which accurate source code has been submitted by the user. In one embodiment, the aggregation may be based on partial test scores, which are generated by adjusting the original test scores by respective weights. The higher weight may be given to a more complex programming task score, and lesser weight may be given to a lower complexity programming task score.

Continuing with FIG. 3, in such an embodiment, to determine what weight to assign to which programming task in a programming set, programming system 100 arranges the programming task scores of the set according to their task scores, at block 320. For example for such a sorted programming task set with programming tasks $\{i_1, \ldots, i_n\}$, the corresponding task scores are $d_1 \leq d_2 \leq \ldots \leq d_n$.

In an embodiment, the weight for a task score for a particular programming task in a programming set is further based on the programming assessment benchmark metrics (simply "benchmarks").

Programming system 100 may define one or more benchmarks specific to a particular programming task and/or a programming task set. Programming system 100 may define standardized time benchmarks based on determining a standardized time for receiving accurate source code(s) for a particular programming task or a particular programming task set. The standardized time may be determined based on one or more models applied to result metrics of evaluations of the particular programming tasks or similar programming tasks by multiple users.

A non-limiting example of standardized time metrics is maximum average score (ms), which is the maximum programming score assigned to a user if accurate source code(s) for all tasks in a programming task set are submitted by the user in a standardized time. Accordingly, if for a sorted programming task set with programming tasks $\{i_1, \ldots, i_n\}$ with the corresponding task scores are $d_1 \leq d_2 \leq \ldots \leq d_n$, then $ms > d_n$.

Continuing with FIG. 3, at block 325, the programming assessment benchmark(s) are identified for determining the weight of each task score of the programming set. At block 330, the partial test scores are calculated based on the weights and test scores of the corresponding programming tasks in the programming set.

A scoring paradigm may assign a full weight to the task score of the most complex programming task for which accurate source code is received. In such an embodiment, based on the definition of the maximum average score benchmark, the scoring paradigm assumes $d_n+p_1+ \ldots +p_{n_1}=ms$ for a sorted programming task set with programming tasks $\{i_1, \ldots, i_n\}$ with the corresponding task scores are $d_1 \leq d_2 \leq \ldots \leq d_n$. Accordingly, the weights for the partial scores and the partial scores of the programming set may be determined using the following equation, as an example:

$$r = \frac{ms - d_n}{\sum_{i=1}^{n-1}(d_i - K)}, \text{ then } p_i = r \cdot (d_i - K)$$

in which the value of K is an arbitrarily selected baseline score for the scoring paradigm of the programming task set. For example, the value of "600" is used for the GCA score range.

Continuing with the above example programming set that includes three programming tasks with $d_1=675$, $d_2=725$, $d_3=775$, the example maximum average score has the value of "825," and the baseline score has the value of "600". Accordingly, r for this example is calculated to be $$r = \frac{825 - 775}{725 - 600 + 675 - 600} = 0.25;$$

and $p_2=0.25 \cdot (725-600)=31.25$, $p_1=0.25 \cdot (675-600)=18.75$.

Programming score for a user for a programming task set may be calculated based on the task scores of solved programming tasks for which accurate source codes have been received from the computer system of the user. In an embodiment, the task score of the most complex solved programming task has the largest weight in calculating the programming score of the user. In such an embodiment, partial task scores are used for less complex solved programming tasks of the programming set for calculating the programming score of the user.

Continuing with FIG. 2, at block 240, programming system 100 determines the weighted programming scores for the solved programming tasks if source code(s) for more than one programming task have been evaluated to be correct at block 225. Accordingly, if the user submitted accurate source codes for k programming tasks $\{i_1, \ldots, i_k\}$, $i_1 < \ldots < i_k$ then the programming score, gs, may be calculated by:

$$gs = d_{i_k} + p_{i_1} + \ldots + p_{i_{k-1}}$$

where $p_1, \ldots, p_{n-1}$ are the weighted task scores.

Figure 4:
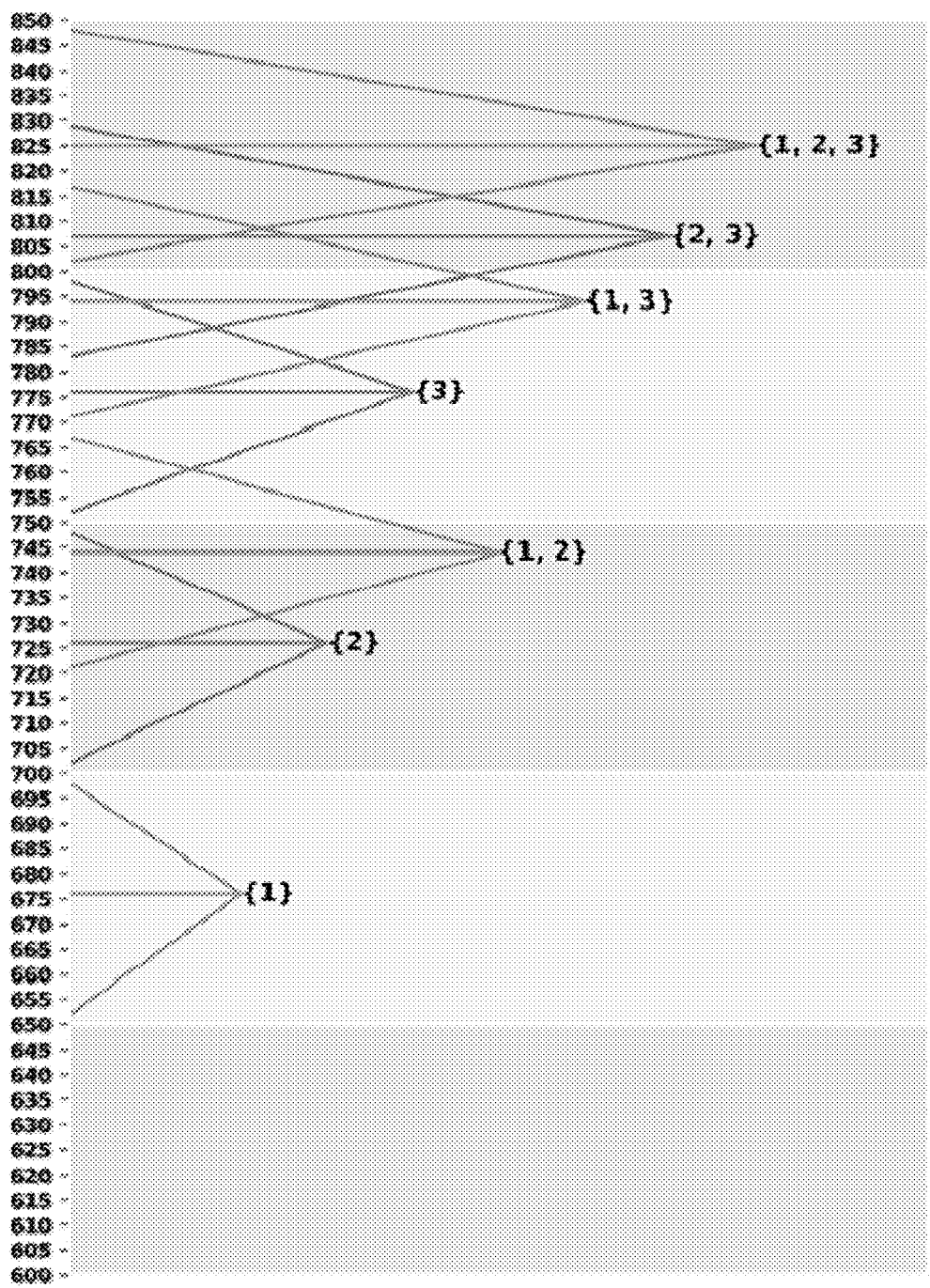
FIG. 4 is a graph that depicts programming scores, and programming score ranges for the example programming task set, in an embodiment.

Continuing with the above example programming set that includes three programming tasks with $d_1=675$, $d_2=725$, $d_3=775$, if accurate source codes have been received for only $i_2$ then gs=725. If accurate source codes have been received for programming task $\{1, 2\}$, then $gs=d_2+p_1=725+18.75=743.75$. FIG. 4 is a graph that depicts programming scores and programming score ranges for the example programming task set, in an embodiment. The horizontal line at {1,2} represents the programming scores of 743.75 for accurate source code submission for {1,2}, as discussed above. Based on similar calculations, the horizontal lines of {1,3} and {2,3} depict the respective programming scores of 775+18.75=793.75 and 775+31.25=806.25 for accurate source code submissions for {1, 3} and {2, 3} programming tasks, respectively. The horizontal line at {1,2,3} of FIG. 4 represents the programming score for accurate source code submission for all three of the tasks in the example programming set {1, 2, 3} with the programming score 825. The horizontal lines at {1}, {2}, {3} of FIG. 4 represents the programming scores for accurate source code submission for only {1}, {2} and {3} programming tasks, respectively.

Inaccurate Source Code Valuation Score

In an embodiment, even if the submitted source code for a programming task is inaccurate, partial result programming score is assigned to the user for the programming task. The partial result programming score is a fraction of the programming score that is assigned to a user for an accurate source code. In an embodiment, the fraction is based on the number of test cases that the submitted source code passes during the evaluation of the source code.

In an embodiment, the programming score of a submission is calculated based on a mathematical function of accurate and inaccurate submission(s) of source code(s) for the programming task set. For example, even if a user fails to submit an accurate source code for a programming task, the function is evaluated based on the calculation of a ratio of passed sample test cases for the source code. The fraction assigned to any source code are referred to as $x_i$ for the i-th programming task in the programming set. Such a fraction, $x_i$, has a sample value from 0 to 1 and indicates the ratio of sample test cases that were evaluated correctly for the respective submitted source code. The programming score function $f(x_1, \ldots, x_n)$ may have the following one or more properties:
- yield zero points when no test case was successfully evaluated $-f(0)=0, 0=(0, \ldots, 0)$, if no task is (at least partially) solved the score is 0
- when only one programming task is solved, the programming score is the difficulty metric for the single task $-f(I_i)=d_i, I_i=(0, \ldots, 1, \ldots, 0)$ where $x_i=1$ and $x_j=0$ (for all $j \neq i$)
- is continuously increasing to the maximum score for solving all programming tasks $-f(x_1, \ldots, x_n) \rightarrow f(y_1, \ldots, y_n)$ when $|x-y| \rightarrow 0$
- is monotonous (i.e. always increases with each additional accurate source code)
- if two users have unequal programming score for a subset of a programming task set and both submit an accurate source code for additional same programming task, the increase in respective programming score fails to alter the original inequality of the programming scores— thus, $f(0, 0, 1, 0) > f(1, 1, 0, 0)$ then $f(0, 0, 1, 1) > f(1, 1, 0, 1)$.
- The maximum score $f(1, \ldots, 1)=ms$ when $d_1+\ldots+d_n=ms$, $f(x_1, \ldots, x_n)=\Sigma_{i=1}^{n} x_i * d_i$ An example programming score function for a programming task set of the first k tasks is $S_k$: $S_k(x_1, \ldots, x_k)=d_k*x_k+(1-(1-c_k)*x_k)*S_{k-1}(x_1, \ldots, x_{k-1})$ where $S_1(x_1)=d_1*x_1$, $S_n(1, \ldots, 1)=ms$ and $0 < c_k \leq 1$ to add increasingly lesser portion of the full task score for each additional lesser complex programming task.

Result Metrics-Based Variation Score

In an embodiment, the programming score is determined based on result metrics for the programming tasks of a programming set. In addition to determining programming score based on the number of solved programming tasks in the programming set, result metrics may be used to adjust the programming score for the user by a variation score. Depending on the result metrics, the variation score may increase the programming score or may decrease the programming score. Continuing with FIG. 2, at block 250, the variation score may be calculated for each programming task in a programming set based on the pre-compile, compile-time, and run-time metrics. In some embodiments, a variation score may be calculated for a programming task for which no accurate source code has been received.

In an embodiment, a variation score is based on a fraction of the task score for the programming task for which source code the variation score is calculated. If for a particular programming task, a partial task score is assigned, then the variation score for the particular programming task may be based on a fraction of the partial score.

Because some result metrics represent only a particular skill of a user to develop the source code for a programming task, the variation score for the programming task may depend on the metric value associated with the programming task and representing the particular skill. For example, the variation score for a programming task may only be based on the code development complexity metric value associated with the programming task.

In an embodiment, a variation score is calculated based on the programming duration for a programming task in a programming task set or a programming set. Example equation below describes the calculation of a programming duration score for a programming task set, speedScore.

$$speedScore = \frac{\sum_{i \text{ is solved}} s_i \cdot cd_i}{\sum_{i=1}^{n} cd_i}$$

where $s_i$ is a number from $-1$ to 1 and represents how fast the user submitted the accurate source code for the task (e.g., $-1$ means two times slower and 1 means two times faster than the average time).

In an embodiment, a variation score for a programming task or a programming task set is calculated based on submission confidence metric, attemptScore.

In an embodiment, a variation score is calculated based on editorial metrics, codeQualityScore, for a programming task or a programming task set. Example equation below describes the editorial metrics score, codeQualityScore, calculation for a programming task set.

$$codeQualityScore = \frac{\sum_{i \text{ is solved}} cq_i \cdot cd_i}{\sum_{i=1}^{n} cd_i}$$

where $cq_i$ is a number from $-1$ to 1 and represents the source code quality weight (e.g., $-1$ means bad source code quality and 1 means good code quality) for each programming task.

In an embodiment, a variation score for a programming task or a programming set is calculated by aggregating a plurality of result metric scores. For example:

$$vs = codeQualityCoef \cdot codeQualityScore + speedCoef \cdot speedScore +$$
$$attemptCoef \cdot attemptScore \text{ in which } codeQualityCoef +$$
$$speedCoef + attemptCoef = 1 \text{ and } codeQualityCoef,$$
$$speedCoef, attemptCoef \geq 0.$$

In an embodiment, a variation score is a fraction of a programming assessment benchmark that depends on one or more result metrics-based scores.

Maximum variation, (mv), is a benchmark that represents maximal possible variation to the programming score of a user for submitting source code(s) for all tasks in a programming task set in a standardized time, without incorrect attempts. The variation itself may be determined using the result metrics for the submitted source code(s) for the programming task(s) from numerous users, in such an example. The maximum variation may be calculated based on the model output of result metrics of evaluations of the same or similar programming tasks by multiple users.

In such an embodiment, the variation score for a programming task or a programming task set is a fraction of the maximum variation score based on the result metrics score. For example, the above-calculated variation score (vs) is multiplied with (mv): vs·mv.

Continuing with FIG. 2, at block 255, programming system 100 determines the programming score for the user for the programming set based on the variation score and weighted programming score(s). For example, weighted programming scores are added to the programming score, which was calculated based on the partial task scores for the solved programming task. Example equation recites codingScore=gs+vs·mv. Note that −1≤vs≤1 so codingScore can vary from gs by at most mv.

Continuing with FIG. 4, the diagonal lines for each of the solved example programming task sets represent the range of the programming score for the set based on the variation score. For example, diagonal lines for {1, 2, 3} represent that the programming score for solving all three programming tasks in the set {1, 2, 3}, the programming score may vary from 800 to 847. The variation is based on the adjusting of the programming score based on the result metrics variation score. Accordingly, as depicted in FIG. 4, a user with an accurate source code submission for programming task {3} may receive almost the same score as another user with an accurate source code submission for all programming tasks {1, 2, 3}. This may occur, if the user's source code evaluates to maximal result metrics and thus, maximal variation score, while the other user has minimal result metrics and thus negative, minimal variation score.

Quiz-Based Evaluations

In an embodiment, in which quiz tasks (usually multiple choice questions with four answer choices) are included with the programming task set. The quiz-based benchmark may be used to determine the quiz score. For example, quiz benchmark for maximum quiz score, (mg), is the maximum score assigned if the answer(s) to all programming quiz tasks are evaluated to be correct.

In an embodiment, quiz tasks are grouped by topic, and each grouped is scored as a unit. Scoring quiz questions by group prevent score inflation due to guessing.

For example, given a group of n quiz tasks and one would get p points if they answer all of them correctly (if we have Q quiz tasks in total then $$p = \frac{n}{Q} \cdot mq \bigg).$$

Then users may be assigned:

$$f(k) = \frac{p}{c^{n-k}} \cdot \frac{k}{n}$$

points if users answer k questions correctly ($f(0)=0$, $f(n)=p$) and $c=3/2$. Accordingly for 4 quiz task example quiz, if 3 correct answers have been received (n=4 and k=3), then only half of the points for the quiz is granted: $f(3) = p*¾*(⅔)=p/2$. Thus, not solving one of the quiz tasks may grant only the half of the score instead of ¾ as it is for the case of g. When using an alternative approach of granting fixed points for solving a single quiz task, the score function would be:

$$g(k) = p \cdot \frac{k}{n}$$

However, $f$ is a better scoring function than g. The expected additional score for the whole programming task set is approximately 10.5 from 100 when selecting randomly.

Prevention of Plagiarism

Even with many different programming task sets and continuous copyright-based leak monitoring, there will still be some users that try to use someone else's source code as their own when submitting to the programming server. In an embodiment, to resolve this issue, an automated plagiarism check is performed by:
  Parsing the syntax of programming languages.
  Compare source codes by removing comments and extra spaces while taking into account token types.
  Find similar source codes from a large database of source codes and flag the most similar source code if they pass a certain similarity threshold while giving a visual diff-based comparison between the user's source code and the similar source code.

Subject-Based Programming Assessment

In an embodiment, the programming assessment techniques described herein are applicable for a subject-specific programming assessment. In such an embodiment, a programming task set is selected to be subject specific, and the skill levels for the programming score are based on the complexity of topics of the subject. For example, a programming assessment paradigm may be generated for a particular programming or scripting language.

Software Overview

Figure 5:
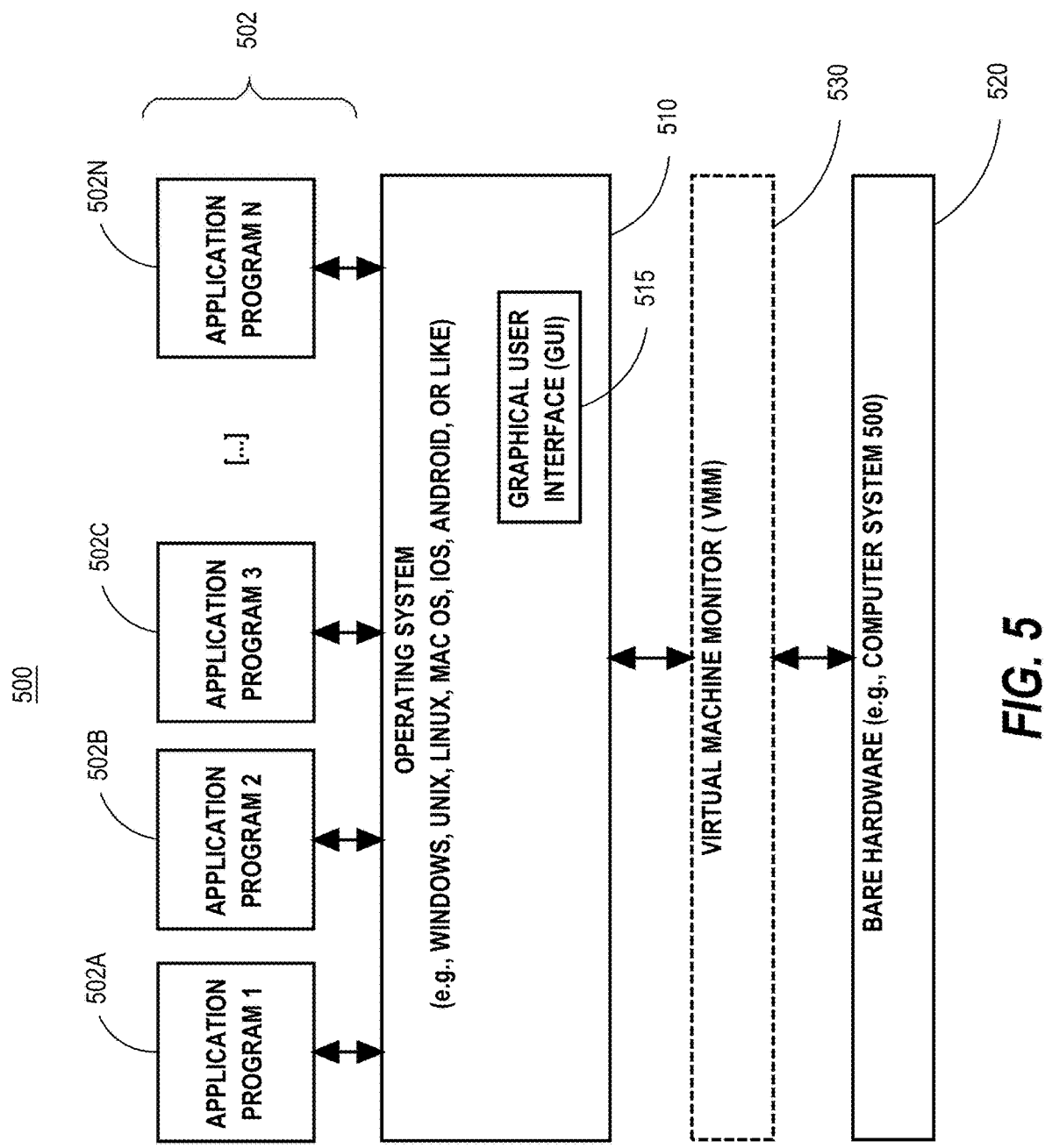
FIG. 5 is a block diagram of a basic software system, in one or more embodiments.
Figure 6:
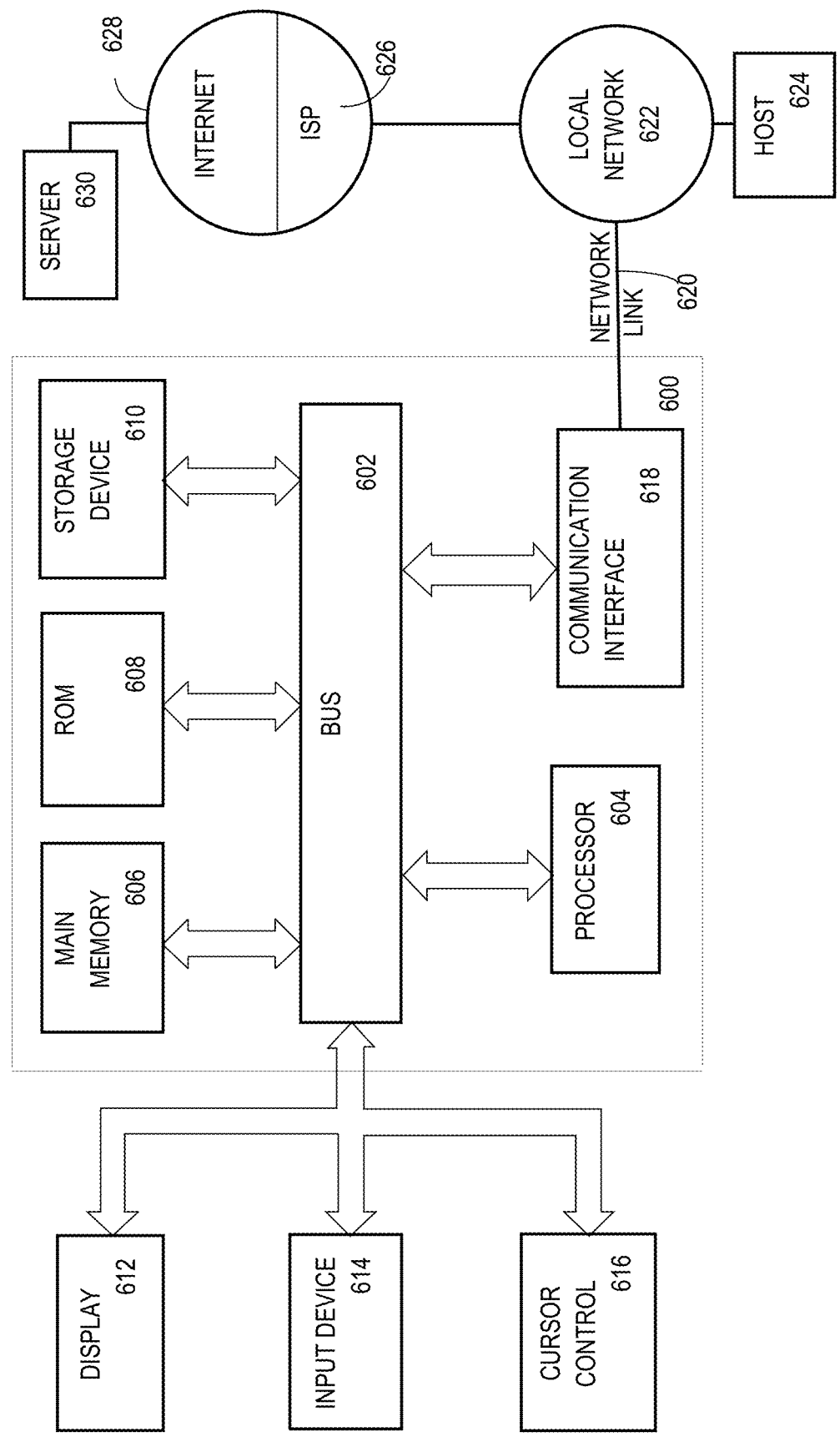
FIG. 6 is a block diagram that illustrates a computer system upon which an embodiment of the invention may be implemented.

FIG. 5 is a block diagram of a basic software system 500 that may be employed for controlling the operation of computing system 600 of FIG. 6. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 600. Software system 500, which may be stored in system memory (RAM) 606 and on fixed storage (e.g., hard disk or flash memory) 610, includes a kernel or operating system (OS) 510.

The OS 510 manages low-level aspects of computer operation, including managing the execution of processes, memory allocation, file input and output (I/O), and device I/O. One or more application programs represented as 502A, 502B, 502C . . . 502N, may be "loaded" (e.g., transferred from fixed storage 610 into memory 606) for execution by the system 500. The applications or other software intended for use on computer system 600 may also be stored as a set of downloadable computer-executable instructions, for example, for downloading and installation from an Internet location (e.g., a Web server, an app store, or another online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 604) of computer system 600. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 600.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 600 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system and may run under the control of other programs being executed on the computer system.

Multiple threads may run within a process. Each thread also comprises an allotment of hardware processing time but share access to the memory allotted to the process. The memory is used to store the content of processors between the allotments when the thread is not running. The term thread may also be used to refer to a computer system process in multiple threads are not running.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers. In a cloud computing environment, there is no insight into the application or the application data. For a disconnection-requiring planned operation, with techniques discussed herein, it is possible to release and then to later rebalance sessions with no disruption to applications.

The above-described basic computer hardware and software and cloud computing environment presented for the purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, or any other device that incorporates hard-wired and/or program logic to implement the techniques.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or another dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read-only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal, and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626, in turn, provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610 or other non-volatile storage for later execution.

Computing Nodes and Clusters

A computing node is a combination of one or more hardware processors that each share access to a byte addressable memory. Each hardware processor is electronically coupled to registers on the same chip of the hardware processor and is capable of executing an instruction that references a memory address in the addressable memory, and that causes the hardware processor to load data at that memory address into any of the registers. In addition, a hardware processor may have access to its separate exclusive memory that is not accessible to other processors. The one or more hardware processors may be running under the control of the same operating system A hardware processor may comprise multiple core processors on the same chip, each core processor ("core") being capable of separately executing a machine code instruction within the same clock cycles as another of the multiple cores. Each core processor may be electronically coupled to connect to a scratch pad memory that cannot be accessed by any other core processor of the multiple core processors.

A cluster comprises computing nodes that each communicate with each other via a network. Each node in a cluster may be coupled to a network card or a network integrated circuit on the same board of the computing node. Network communication between any two nodes occurs via the network card or network integrated circuit on one of the nodes and a network card or network integrated circuit of another of the nodes. The network may be configured to support remote direct memory access.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   selecting a programming task set with a plurality of programming tasks at random, wherein each programming task of the programming task set corresponds to a task category of a plurality of task categories;
   establishing one or more programming sessions initiated by a client computer system of a particular user with one or more programming computer servers;
   receiving, at the one or more programming computer servers, a plurality of source codes submitted for the programming task set in the one or more programming sessions with the client computer system of the particular user;
   executing, at the one or more programming computer servers, the plurality of source codes to evaluate accuracy of the plurality of source codes;
   determining that two or more source codes of the plurality of source codes are evaluated to be accurate based on the executing of the plurality of source codes, wherein the two or more source codes are submissions for two or more solved programming tasks of the programming task set, each solved programming task of the two or more solved programming tasks corresponding to a respective task category;
   determining a respective task score for said each solved programming task, of the two or more solved programming tasks thereby generating at least two programming task scores for the two or more solved programming tasks for at least two source codes, wherein the respective task score for said each solved programming task is based at least in part on the respective task category of said each solved programming task;
   wherein the executing of the plurality of source codes comprises:
      compiling, at the one or more programming computer servers, the at least two source codes of the plurality of source codes, and collecting compile-time metrics for the at least two source codes of the plurality of source codes, and
      executing, at the one or more programming computer servers, the at least two source codes of the plurality of source codes and collecting run-time metrics for the execution of the at least two source codes of the plurality of source codes;
   adjusting the at least two programming task scores for the two or more solved programming tasks by increasing or decreasing the at least two programming task scores based at least on the compile-time metrics and the run-time metrics for the at least two source codes of the plurality of source codes thereby generating at least two adjusted programming task scores;
   sorting the at least two adjusted programming task scores to yield a higher programming score and a lower programming score of the at least two adjusted programming task scores;
   determining a partial programming score for the lower programming score of the at least two adjusted programming task scores;

determining a programming score for the particular user for the programming task set, wherein the programming score comprises the higher programming score and the partial programming score of the lower programming score.

2. The method of claim 1, wherein selecting the programming task set with the plurality of programming tasks at random comprises selecting at random, from multiple programming tasks associated with a corresponding task category of the plurality of task categories, a random programming task for each programming task of the plurality of programming tasks in the programming task set.

3. The method of claim 1, further comprising:
based on the executing:
determining that at least one source code of the plurality of source codes is evaluated to be inaccurate, wherein the at least one source code corresponds to an unsolved programming task from the programming task set, and
determining a task score fraction for the unsolved programming task from the programming task set;
determining a partial task score of the unsolved programming task based on complexity metrics of each programming task in the programming task set and a maximum score assigned to the programming task set;
based on the task score fraction and the partial task score of the unsolved programming task, determining the programming score for the particular user for the programming task set.

4. The method of claim 1, further comprising:
determining a partial task score of a particular solved programming task of the two or more solved programming tasks in the programming task set, based on complexity metrics of each programming task in the programming task set and a pre-defined maximum programming score that can be assigned to a user for the programming task set;
based on the partial task score of the particular solved programming task, determining the programming score for the particular user for the programming task set.

5. The method of claim 1, the method further comprising:
based on complexity metrics of the two or more solved programming tasks, determining the at least two programming task scores for the two or more solved programming tasks of the programming task set;
based on the at least two programming task scores for the two or more solved programming tasks of the programming task set, determining a most difficult solved programming task from the programming task set having a maximal task score;
determining a partial task score of a particular solved programming task for at least one solved programming tasks in the programming task set that is not the most difficult solved programming task, based on complexity metrics of each programming task in the programming task set and a pre-defined maximum programming score that can be assigned to a user for the programming task set;
based on the partial task score of the particular solved programming task and the maximal task score for the most difficult solved programming task in the programming task set, determining the programming score for the particular user for the programming task set.

6. The method of claim 1, further comprising:
determining one or more pre-compile metrics for the programming task set;
based on the one or more pre-compile metrics, calculating variation programming score;
adjusting the programming score for the particular user for the programming task set by the variation programming score.

7. The method of claim 6, wherein the one or more pre-compile metrics include one or more of: programming duration, an editorial metric and a submission confidence metric.

8. The method of claim 6, wherein the variation programming score is based on a fraction of a maximum variation score for the programming task set.

9. The method of claim 1, wherein a scoring paradigm determines a pre-defined maximum programming score that can be assigned to a user for the programming task set.

10. The method of claim 1, wherein a first programming task of the two or more solved programming tasks in the programming task set is associated with a first task category, which is different than a second task category, with which a second programming task of the two or more solved programming tasks in the programming task set is associated.

11. The method of claim 10, wherein the first task category has a first task score range different from a second task score range of the second task category.

12. The method of claim 1, wherein the one or more programming sessions are first one or more programming sessions, the client computer system is a first client computer system, the one or more programming computer servers is first one or more programming computer servers, the plurality of source codes is a first plurality of source codes, the particular user is a first user, the plurality of programming tasks is a first plurality of programming tasks, the programming task set is a first programming task set, the programming score is a first programming score:
establishing second one or more programming sessions initiated by a second client computer system of the first user with second one or more programming computer servers;
the second one or more programming computer servers receiving a second plurality of source codes submitted for a corresponding second plurality of programming tasks of a second programming task set in the one or more second programming sessions with the second client computer system of the first user;
wherein each second programming task in the corresponding second plurality of programming tasks corresponds to each particular task category of the plurality of task categories but is different than corresponding each first programming task, corresponding to said each particular task category, in the first plurality of programming tasks;
the second one or more programming computer servers executing the second plurality of source codes to evaluate accuracy of the second plurality of source codes;
based on the executing the second plurality of source codes, determining a second programming score for the first user for the second programming task set;
wherein the second programming score for the first user for the second programming task set and the first programming score for the first user for the second programming task set correspond to a same user skill-level category of a plurality of user categories.

13. The method of claim 12, wherein each of the plurality of user categories corresponds to each of the plurality of task categories.

14. The method of claim 12, wherein each user skill-level category of the plurality of user skill-level categories differ from each other based on a programming score range assigned to said each user skill-level category.

15. The method of claim 12, wherein said each particular task category of the plurality of task categories differ from each other based on a task score range assigned to said each particular task category.

16. The method of claim 12, further comprising:
receiving a third plurality of source codes submitted for a corresponding third plurality of programming tasks of a third programming task set in one or more third programming sessions with a third client computer system of a second user different from the first user;
wherein each third programming task in the corresponding third plurality of programming tasks corresponds to said each particular task category of the plurality of task categories but is different than corresponding each first programming task in the first plurality of programming tasks and said each second programming task in the corresponding second plurality of programming tasks;
executing the third plurality of source codes to evaluate accuracy of the third plurality of source codes;
based on the executing the third plurality of source codes, determining a third programming score for the second user for the second programming task set;
wherein the third programming score for the second user for the third programming task set corresponds to another user skill-level category of the plurality of user categories.

17. One or more programming computer servers comprising:
one or more processors;
one or more storage media storing one or more computer programs for execution by the one or more processors, the one or more computer programs comprising instructions for:
selecting a programming task set with a plurality of programming tasks at random, wherein each programming task of the programming task set corresponds to a task category of a plurality of task categories;
establishing one or more programming sessions initiated by a client computer system of a particular user with one or more programming computer servers;
receiving, at the one or more programming computer servers, a plurality of source codes submitted for the programming task set in the one or more programming sessions with the client computer system of the particular user;
executing, at the one or more programming computer servers, the plurality of source codes to evaluate accuracy of the plurality of source codes;
determining that two or more source codes of the plurality of source codes are evaluated to be accurate based on the executing of the plurality of source codes, wherein the two or more source codes are submissions for two or more solved programming tasks of the programming task set, each solved programming task of the two or more solved programming tasks corresponding to a respective task category;
determining a respective task score for said each solved programming task, of the two or more solved programming tasks thereby generating at least two programming task scores for the two or more solved programming tasks for at least two source codes, wherein the respective task score for said each solved programming task is based at least in part on the respective task category of said each solved programming task;
wherein the executing of the plurality of source codes comprises:
compiling, at the one or more programming computer servers, the at least two source codes of the plurality of source codes, and collecting compile-time metrics for the at least two source codes of the plurality of source codes, and
executing, at the one or more programming computer servers, the at least two source codes of the plurality of source codes and collecting run-time metrics for the execution of the at least two source codes of the plurality of source codes;
adjusting the at least two programming task scores for the two or more solved programming tasks by increasing or decreasing the at least two programming task scores based at least on the compile-time metrics and the run-time metrics for the at least two source codes of the plurality of source codes thereby generating at least two adjusted programming task scores;
sorting the at least two adjusted programming task scores to yield a higher programming score and a lower programming score of the at least two adjusted programming task scores;
determining a partial programming score for the lower programming score of the at least two adjusted programming task scores;
determining a programming score for the particular user for the programming task set, wherein the programming score comprises the higher programming score and the partial programming score of the lower programming score.

18. The one or more programming computer servers of claim 17, wherein selecting the programming task set with the plurality of programming tasks at random comprises selecting at random, from multiple programming tasks associated with a corresponding task category of the plurality of task categories, a random programming task for each programming task of the plurality of programming tasks in the programming task set.

19. One or more non-transitory computer-readable media storing a set of instructions, wherein the set of instructions includes instructions, which, when executed by one or more hardware processors, cause:
selecting a programming task set with a plurality of programming tasks at random, wherein each programming task of the programming task set corresponds to a task category of a plurality of task categories;
establishing one or more programming sessions initiated by a client computer system of a particular user with one or more programming computer servers;
receiving, at the one or more programming computer servers, a plurality of source codes submitted for the programming task set in the one or more programming sessions with the client computer system of the particular user;
executing, at the one or more programming computer servers, the plurality of source codes to evaluate accuracy of the plurality of source codes;
determining that two or more source codes of the plurality of source codes are evaluated to be accurate based on the executing of the plurality of source codes, wherein the two or more source codes are submissions for two or more solved programming tasks of the programming task set, each solved programming task of the two or more solved programming tasks corresponding to a respective task category;

determining a respective task score for said each solved programming task, of the two or more solved programming tasks thereby generating at least two programming task scores for the two or more solved programming tasks for at least two source codes, wherein the respective task score for said each solved programming task is based at least in part on the respective task category of said each solved programming task;

wherein the executing of the plurality of source codes comprises:

compiling, at the one or more programming computer servers, the at least two source codes of the plurality of source codes, and collecting compile-time metrics for the at least two source codes of the plurality of source codes, and executing, at the one or more programming computer servers, the at least two source codes of the plurality of source codes and collecting run-time metrics for the execution of the at least two source codes of the plurality of source codes;

adjusting the at least two programming task scores for the two or more solved programming tasks by increasing or decreasing the at least two programming task scores based at least on the compile-time metrics and the run-time metrics for the at least two source codes of the plurality of source codes thereby generating at least two adjusted programming task scores;

sorting the at least two adjusted programming task scores to yield a higher programming score and a lower programming score of the at least two adjusted programming task scores;

determining a partial programming score for the lower programming score of the at least two adjusted programming task scores;

determining a programming score for the particular user for the programming task set, wherein the programming score comprises the higher programming score and the partial programming score of the lower programming score.

20. The one or more non-transitory computer-readable media of claim 19, wherein the set of instructions includes instructions, which, when executed by one or more hardware processors, cause selecting the programming task set with the plurality of programming tasks at random comprises selecting at random, from multiple programming tasks associated with a corresponding task category of the plurality of task categories, a random programming task for each programming task of the plurality of programming tasks in the programming task set.

* * * * *